UNITED STATES PATENT OFFICE.

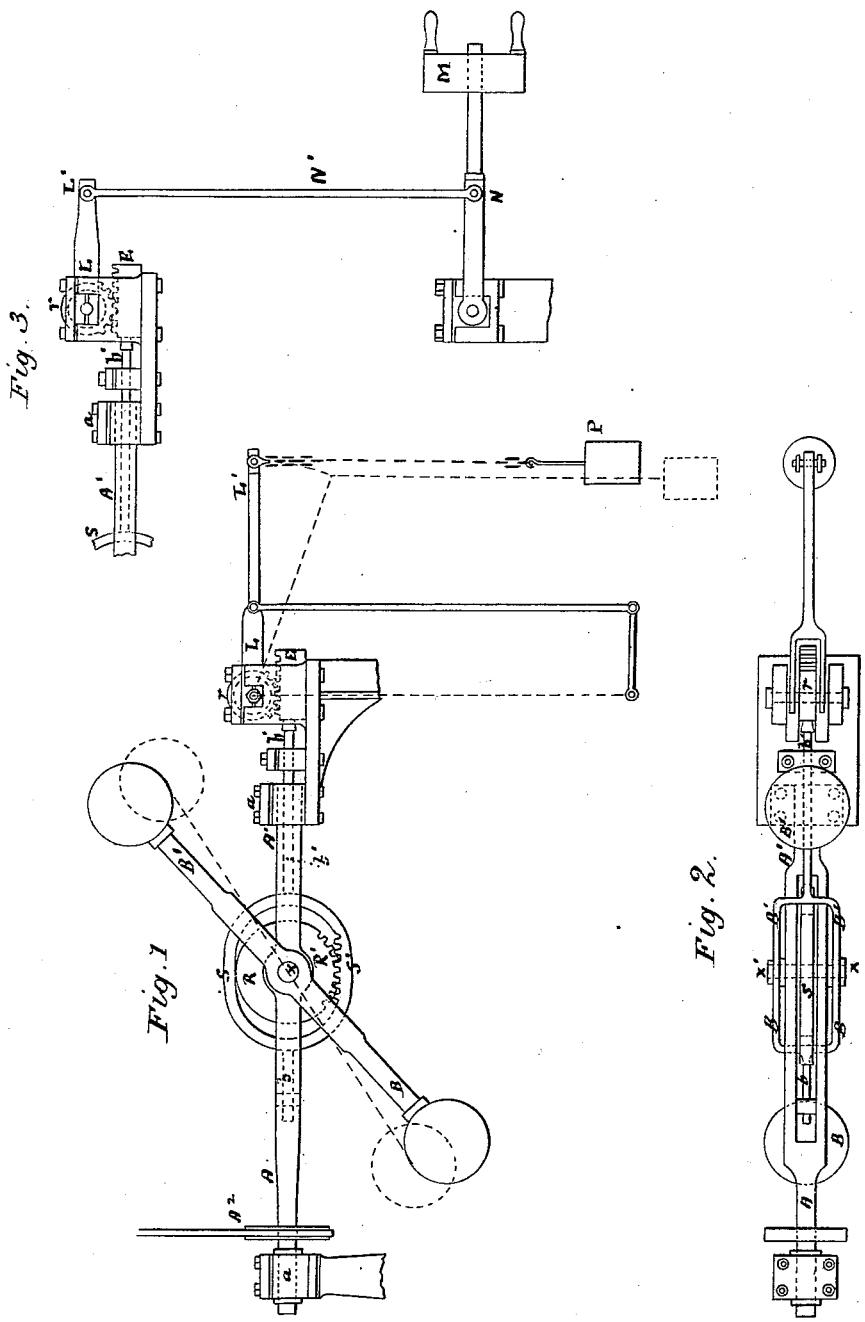

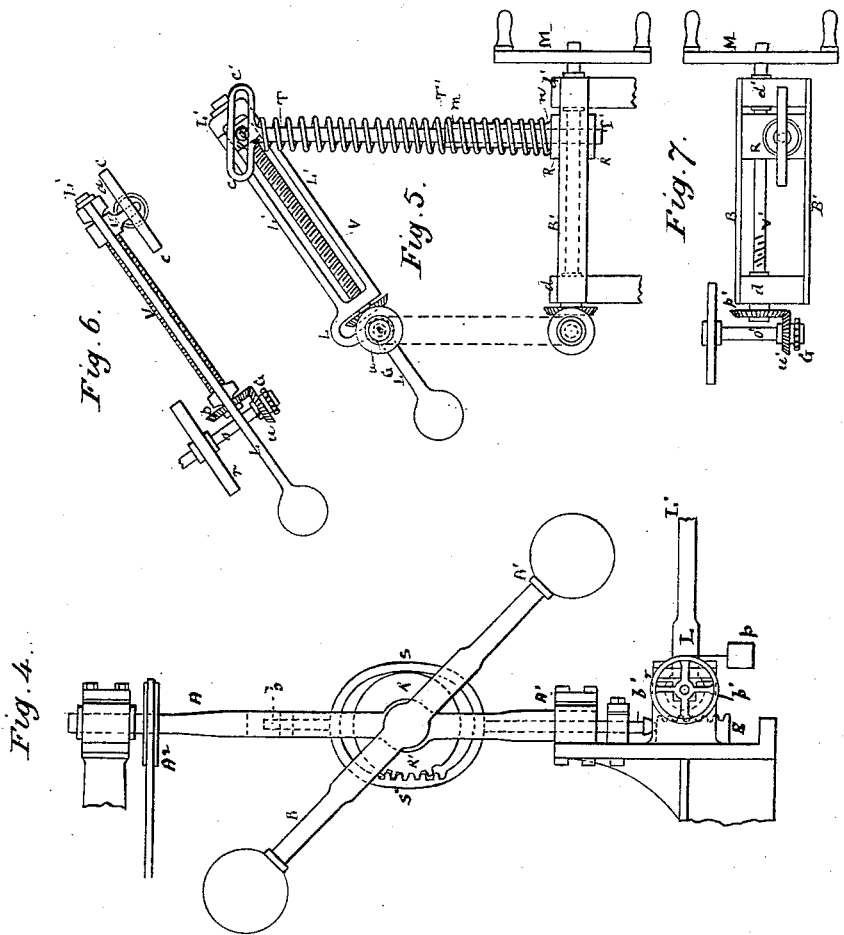

MICHEL ANDRADE, OF CHERBOURG, FRANCE.

IMPROVEMENT IN GOVERNORS.

Specification forming part of Letters Patent No. 148,913, dated March 24, 1874; application filed February 23, 1874.

*To all whom it may concern:*

Be it known that I, MICHEL ANDRADE, of Cherbourg, in the Republic of France, have invented certain new and useful Improvements in Governors, of which the following is a specification:

In order that motor machines shall have a regular speed, whatever may be the variations in the motive power, or the resistances to be overcome by that power, it is necessary, among other things, to provide these machines with an isochronous governor. The improvements that I have devised relate to this point.

So far as my knowledge extends, isochronous governors hitherto devised, are either only approximately isochronous or are very complicated. The governor in which my invention is comprised, while of extreme simplicity, is absolutely isochronous. It is easily put up, and can be readily made to change the working speed without requiring stoppage of the engine.

Figure 1 is a side elevation, and Fig. 2 a plan, of a regulating apparatus embodying my invention.

A $A^1$ is a hollow horizontal arbor, supported in suitable bearings $a\ a$, and receiving by suitable means, indicated at $A^2$, a movement of rotation from the machine which it regulates. This shaft is slotted longitudinally for the greater portion of its length, and through the slot passes the transverse pin or short arbor X X', which, while partaking of the rotary movement of the arbor A $A^1$, is also capable of revolving on itself or on its own axis. On this short transverse arbor are fixed, first, the toothed wheel or sector R R', which is located in the slot in the arbor A $A^1$; second, the equilibrium lever B B'. This lever, at its center, is made in the form of a rectangular yoke, as shown, so that it may take its bearing on the ends of the transverse arbor X X', outside of the shaft A $A^1$. Within the slot in arbor A $A^1$, and encircling the wheel or sector R R', is the toothed frame S S', which, at its ends, terminates in spindles $b\ b'$, taking their bearings in the hollow arbor A $A^1$. This frame is capable of a longitudinal movement to and fro, being actuated thereto by wheel R R'. The outer end of its spindle $b'$ bears against the sliding rack E, which is supported in suitable stationary bearings, by which is also carried a toothed-wheel, $r$, gearing with said rack, and having fixed on its axis a lever, L L', terminating in a weight, P. The diameter of the wheel $r$ is equal to the radius of the wheel R R'. The movement of the lever L L' or of the rack E' produced by the longitudinal movement of the toothed frame S S', acting upon rack E during the working of the apparatus, is transmitted to the valve or other part to be regulated.

The working speed can be changed, without stopping the machine, in two ways, first, by increasing or decreasing the weight P; second, or by changing the point at which the weight is applied.

This last arrangement is represented in Fig. 3. In this figure the weight is represented by the hand-wheel M, which, for the sake of convenience of manipulation, is placed, not on the lever L L', but on a second lever, N, jointed at one end to some stationary part, carrying on its other end the hand-wheel M, and connected with lever L L' by the intermediate vertical connecting-rod N'. The hand-wheel may be adapted to slide on the lever N, or the two may be screw-threaded, so that by turning the hand-wheel it can be brought to the proper point on the lever.

In Figs. 1, 2, and 3 the rotating main arbor is horizontal, but it can have any degree of inclination desired. Fig. 4 represents an arrangement in which the arbor is vertical.

Under this arrangement it is possible that the weight of the two racks E S S' might interfere with the isochronism. However slight and trifling this cause of error, I neutralize it completely by means of a small weight, $p$, attached to the end of a cord which is wound in or passes partly around the periphery of a small pulley, $p'$, fixed on the axis of the wheel $r$, said cord being fastened to the pulley at a suitable point in the peripheral groove of the same. The weight tends to move the wheel $r$ in a direction contrary to that in which it would be moved by the weight of the two racks, and it is so proportioned as to neutralize the latter. The same arrangement can be used in case the main arbor, instead of being vertical, is oblique.

In order to apply my system of governor to marine engines, I replace weight P by a spring of such length that its tension may be considered as practically constant. In order, however, to remove the slight cause of error just noted, I employ, when operating on the lever L L' by means of a spring, devices such as represented in Figs. 5, 6, and 7. I double the diameter of the wheel or sector r, so that it shall equal the diameter of the wheel or sector R; and I balance the lever L L', and so place it that it shall maintain constantly with the prolongation of the axis of rotation of the main arbor an angle equal to that which the main weighted or ball lever makes with the same axis.

The movement of the main or ball lever is transmitted to the lever L L', which, in this instance is equilibrated, exactly as in the apparatus described in the preceding figures, and I therefore in the present figures represent only the new part of the apparatus.

Fig. 5 is a side elevation of this part of the apparatus. Fig. 6 is a top view of the upper portion of the same. Fig. 7 is a top view of the lower portion of the apparatus, the lever and its immediate adjunct being removed.

The lever L L' is fixed on the axis o of the wheel r, as in Figs. 1, 2, and 3. It is formed, as seen in Fig. 6, with bearings, to support a screw, V, hereinafter more particularly described. On the screw is mounted a nut, v, carrying a button, a. This nut is guided by the lateral faces of the lever, and is moved in one direction or the other by rotating the screw V. The button a works in a slotted head, c c', which is fixed on the end of a rod, T T', which can slide up and down in a sleeve, m n. The lower end of the sleeve is fixed to a nut, R, carried by a horizontal screw, V', supported in suitable stationary bearings d d', between which extend the paralleled guide-bars B B', by which the nut R' is guided. Encircling the rod T T' is the spiral spring, one end of which bears against the head c c' and the other end against the nut R.

The two screws V V' are caused to revolve in unison through the instrumentalities about to be described, which are put in action by means of a hand-wheel, M, keyed on the end or arbor of screw V'. p is a beveled gear, fixed on the arbor of screw-shaft V. A like gear, u, meshing with p is loose on the arbor o, and carries on its hub a cog-wheel, G. On the arbor of the lower screw V' there is fixed a beveled gear, p', and on an axis, o', supported in suitable bearings, is a beveled gear, u, meshing with the pinion p', and carrying on its hub a cog-wheel, G'. The two cogged wheels G G' are connected by a suitable chain—as, for instance, what is known as Galle's chain—which engages the cogs on the wheels, and so transmit a positive movement of rotation from the lower wheel to the upper one.

The vibration of the lever L L' on its axis will not affect the engaging of the upper beveled pinions p u, inasmuch as the latter is mounted upon the axis of vibration of the said lever, and consequently of the pinion p, which is carried by the lever.

Under this arrangement of parts just described, the rod T T' and its encircling spring, while constantly preserving their perpendicularity, can, by turning the hand-wheel M, be moved toward or away from the axis o of the lever L L', as desired.

Having now described my invention, and the manner in which the same is or may be carried into effect, what I claim, and desire to secure by Letters Patent, is—

The combination, with the main rotary arbor, the toothed wheel or sector, its operating ball-lever, and the rack-frame carried by said arbor, of the auxiliary rack E, toothed wheel or sector r, and lever L L' fixed to the axis of said wheel or sector, and connected with an adjustable resistance apparatus, either spring or weight, acting on said lever to regulate the resistance offered by the rack E to the longitudinal movement of the rack-frame of the main arbor, as and for the purposes shown and set forth.

In testimony whereof I have signed my name to this specification before two subscribing witnesses.

MICHEL ANDRADE.

Witnesses:
N. GARNIER,
G. DELACTY.